United States Patent
Park et al.

(10) Patent No.: US 9,980,312 B2
(45) Date of Patent: *May 22, 2018

(54) METHOD AND APPARATUS FOR PERFORMING RANDOM ACCESS PROCEDURE IN WIRELESS COMMUNICATION SYSTEM

(71) Applicant: LG ELECTRONICS INC., Seoul (KR)

(72) Inventors: Sungjun Park, Seoul (KR); Youngdae Lee, Seoul (KR); Seungjune Yi, Seoul (KR); Sunghoon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days. days.

This patent is subject to a terminal disclaimer.

(21) Appl. No.: 15/613,783

(22) Filed: Jun. 5, 2017

(65) Prior Publication Data

US 2017/0273132 A1 Sep. 21, 2017

Related U.S. Application Data

(63) Continuation of application No. 14/651,554, filed as application No. PCT/KR2014/006414 on Jul. 16, 2014, now Pat. No. 9,699,823.

(Continued)

(51) Int. Cl.
*H04W 76/04* (2009.01)
*H04L 1/18* (2006.01)
(Continued)

(52) U.S. Cl.
CPC ............ *H04W 76/04* (2013.01); *H04L 1/12* (2013.01); *H04L 1/1812* (2013.01);
(Continued)

(58) Field of Classification Search
CPC ..... H04W 76/04; H04W 74/08; H04W 74/04; H04W 72/0406; H04W 56/0045;
(Continued)

(56) References Cited

U.S. PATENT DOCUMENTS 9,560,652 B2* 1/2017 Koskinen ................ H04L 5/001
2011/0103328 A1* 5/2011 Lee ........................ H04W 74/004
370/329

(Continued)

FOREIGN PATENT DOCUMENTS

CN 102457917 5/2012
WO 2013025237 2/2013
(Continued)

OTHER PUBLICATIONS

Research in Motion, UK Limited, "Clarification on the endorsed CR for TS 36.213," 3GPP TSG RAN WG1 Meeting #62bis, R1-105510, Oct. 2010, 5 pages.

(Continued)

*Primary Examiner* — Afshawn M Towfighi
(74) *Attorney, Agent, or Firm* — Lee Hong Degerman Kang Waimey

(57) ABSTRACT

A method and apparatus for performing a random access (RA) procedure in a wireless communication system is provided. A user equipment (UE) establishes connection with a first node and a second node, and transmits an RA preamble to the second node. If a number of RA preamble transmissions reaches a maximum number, the UE stops uplink (UL) transmission of all cells in a group to which the second node belongs, and transmits an indication indicating that transmission of the RA preamble has failed to the first node.

8 Claims, 20 Drawing Sheets

Related U.S. Application Data

(60) Provisional application No. 61/856,070, filed on Jul. 19, 2013.

(51) Int. Cl.

| | | |
|---|---|---|
| *H04W 74/08* | (2009.01) | |
| *H04L 1/12* | (2006.01) | |
| *H04W 76/02* | (2009.01) | |
| *H04W 72/04* | (2009.01) | |
| *H04W 56/00* | (2009.01) | |
| *H04W 74/04* | (2009.01) | |
| *H04L 5/00* | (2006.01) | |
| *H04W 88/02* | (2009.01) | |
| *H04W 88/08* | (2009.01) | |

(52) U.S. Cl.
CPC ... *H04W 56/0045* (2013.01); *H04W 72/0406* (2013.01); *H04W 74/04* (2013.01); *H04W 74/08* (2013.01); *H04W 76/027* (2013.01); *H04L 5/001* (2013.01); *H04W 88/02* (2013.01); *H04W 88/08* (2013.01)

(58) Field of Classification Search
CPC ... H04W 76/027; H04W 88/02; H04W 88/08; H04L 1/1812; H04L 1/12; H04L 5/001
See application file for complete search history.

(56) References Cited

U.S. PATENT DOCUMENTS

| | | | | |
|---|---|---|---|---|
| 2012/0106510 | A1* | 5/2012 | Kuo | H04W 76/064 370/331 |
| 2013/0003700 | A1* | 1/2013 | Zhang | H04W 76/028 370/331 |
| 2013/0286958 | A1* | 10/2013 | Liang | H04W 74/0866 370/329 |
| 2014/0293896 | A1* | 10/2014 | Kuo | H04W 72/0413 370/329 |
| 2015/0117183 | A1* | 4/2015 | Heo | H04W 36/0055 370/228 |
| 2015/0319800 | A1 | 11/2015 | Park et al. | |

FOREIGN PATENT DOCUMENTS

| | | |
|---|---|---|
| WO | 2013/043008 | 3/2013 |
| WO | 2013/048332 | 4/2013 |
| WO | 2014163082 | 10/2014 |

OTHER PUBLICATIONS

Renesas Mobile Europe, "UL transmission of dual connectivity," 3GPP TSG-RAN WG2 Meeting #82, R2-131849, May 2013, 5 pages.

Pantech, "UL transmission on dual connectivity," 3GPP TSG-RAN WG2 Meeting #82, R2-131802, May 2013, 9 pages.

PCT International Application No. PCT/KR2014/006414, Written Opinion of the International Searching Authority dated Oct. 15, 2014, 1 page.

Japan Patent Office Application No. 2016-515290, Office Action dated Jul. 4, 2016, 3 pages.

European Patent Office Application Serial No. 14826512.7, Search Report dated Feb. 7, 2017, 7 pages.

The State Intellectual Property Office of the People's Republic of China Application Serial No. 201480003777.1, Office Action dated Nov. 27, 2017, 9 pages.

Intel Corporation, "Radio link failure handling for dual connectivity", R2-131990, 3GPP TSG RAN WG2 Meeting #82, May 2013, 4 pages.

Pantech, "Analysis of the RLF in dual connectivity", R2-131100, 3GPP TSG-RAN WG2 Meeting #81bis, Apr. 2013, 5 pages.

\* cited by examiner (a)

(b)

----- Backhaul link within cluster
------- Backhaul link between small cells and macro cell

METHOD AND APPARATUS FOR PERFORMING RANDOM ACCESS PROCEDURE IN WIRELESS COMMUNICATION SYSTEM

CROSS-REFERENCE TO RELATED APPLICATIONS

This application is a continuation of U.S. patent application Ser. No. 14/651,554, filed on Jun. 11, 2015, now U.S. Pat. No. 9,699,823, which is the National Stage filing under 35 U.S.C. 371 of International Application No. PCT/KR2014/006414, filed on Jul. 16, 2014, which claims the benefit of U.S. Provisional Application No. 61/856,070, filed on Jul. 19, 2013, the contents of which are all hereby incorporated by reference herein in their entirety.

BACKGROUND OF THE INVENTION

Field of the Invention

The present invention relates to wireless communications, and more specifically, to a method and apparatus for performing a random access procedure in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable. Small cell enhancements for the 3GPP LTE will focus on additional functionalities for enhanced performance in hotspot areas for indoor and outdoor using low power nodes.

In LTE Rel-12, a new study on small cell enhancement has started, where dual connectivity is supported. Dual connectivity is an operation where a given UE consumes radio resources provided by at least two different network points (master eNB (MeNB) and secondary eNB (SeNB)) connected with non-ideal backhaul while in RRC_CONNECTED. Furthermore, each eNB involved in dual connectivity for a UE may assume different roles. Those roles do not necessarily depend on the eNB's power class and can vary among UEs.

In dual connectivity, a UE may perform random access procedures with both the MeNB and the SeNB. Meanwhile, a random access problem, which means that the random access procedure has been unsuccessful until the number of RA preamble transmissions reaches the maximum number, can be occurred. A method for handling a random access problem in dual connectivity may be required.

SUMMARY OF THE INVENTION

The present invention provides a method and apparatus for performing a random access procedure in a wireless communication system. The present invention provides a method for handling a random access problem in dual connectivity. The present invention provides a method for stopping uplink (UL) transmission in a cell if the number of random access (RA) preamble transmissions reaches the maximum number.

In an aspect, a method for performing, by a user equipment (UE), a random access (RA) procedure in a wireless communication system is provided. The method includes establishing connection with a first node and a second node, transmitting an RA preamble to the second node, and if a number of RA preamble transmissions reaches a maximum number, stopping uplink (UL) transmission of all cells in a group to which the second node belongs.

The group may be configured by an eNodeB (eNB). The group may include a timing advance group (TAG), and the same TA may be applied to all of cells in the TAG.

The UL transmission may include at least one of a physical uplink share channel (PUSCH) transmission, a physical uplink control channel (PUCCH) transmission, an RA preamble transmission, a channel state information (CSI) reporting, a scheduling request (SR) transmission, a hybrid automatic repeat request (HARQ) feedback, or a sounding reference signal (SRS) transmission.

The method may further include, if the number of RA preamble transmissions reaches the maximum number, transmitting an indication indicating that transmission of the RA preamble has failed to the first node. The method may further include, if the number of RA preamble transmissions reaches the maximum number, prohibiting performing of a radio resource control (RRC) connection re-establishment with the second node.

The first node may be a master eNodeB (MeNB) in which a signaling radio bearer (SRB) is defined, and the second node may be a secondary eNB (SeNB) in which the SRB is not defined. Or, the first node may be an SeNB, and the second node is an MeNB.

The RA preamble may be randomly selected from a set of RA preambles by the UE. The RA preamble may be assigned by an eNB.

In another aspect, a user equipment (UE) in a wireless communication system is provided. The UE includes a radio frequency (RF) unit configured to transmit or receive a radio signal, and a processor coupled to the RF unit, and configured to establish connection with a first node and a second node, transmit a random access (RA) preamble to the second node, and if a number of RA preamble transmissions reaches a maximum number, stop uplink (UL) transmission of all cells in a group to which the second node belongs.

Wrong transmission to a secondary eNodeB (SeNB) in dual connectivity can be avoided, and accordingly, interference problem can be solved. Further, unnecessary radio resource control (RRC) connection re-establishment can be avoided while being connected to a master eNB (MeNB).

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
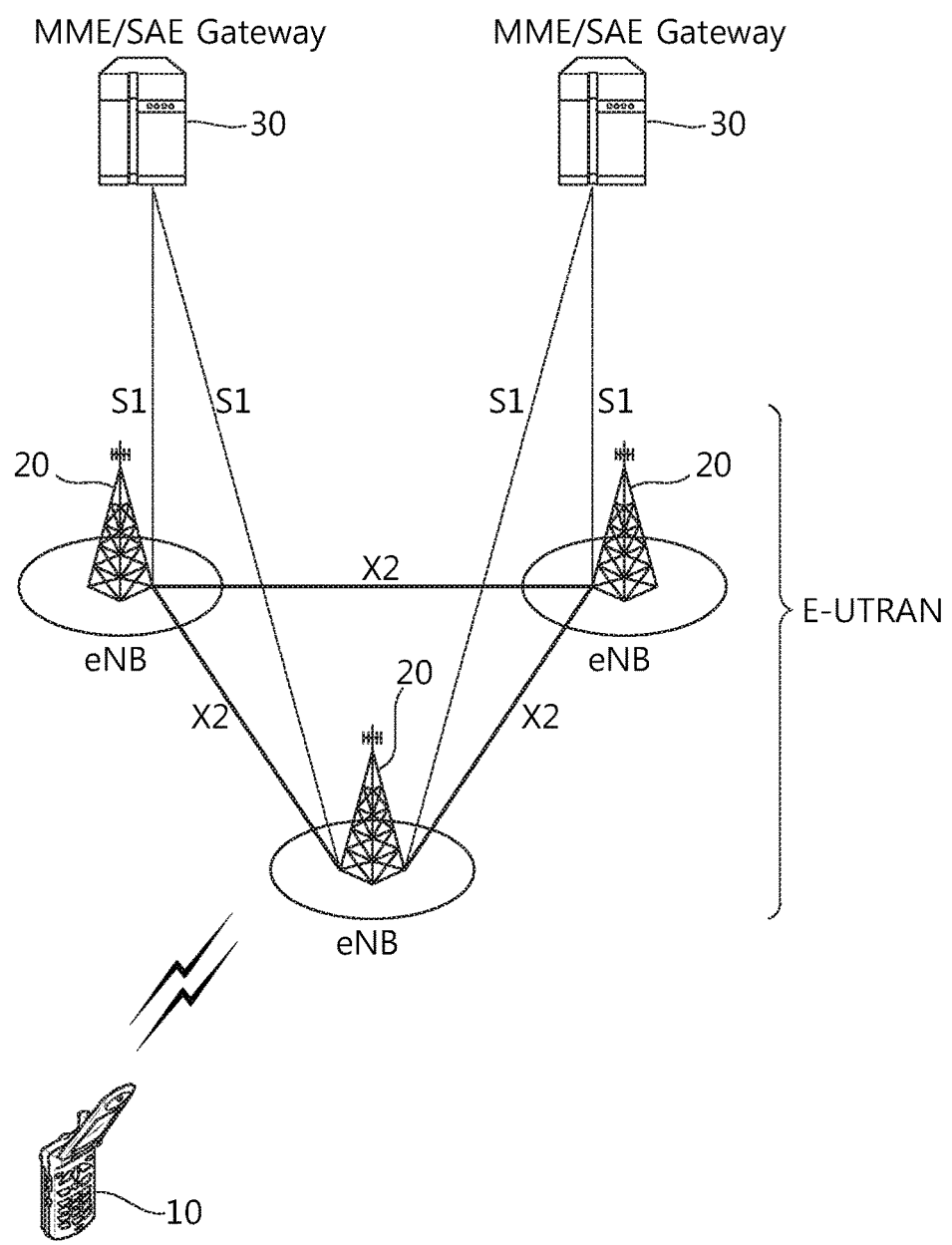
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-

GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

Figure 2:
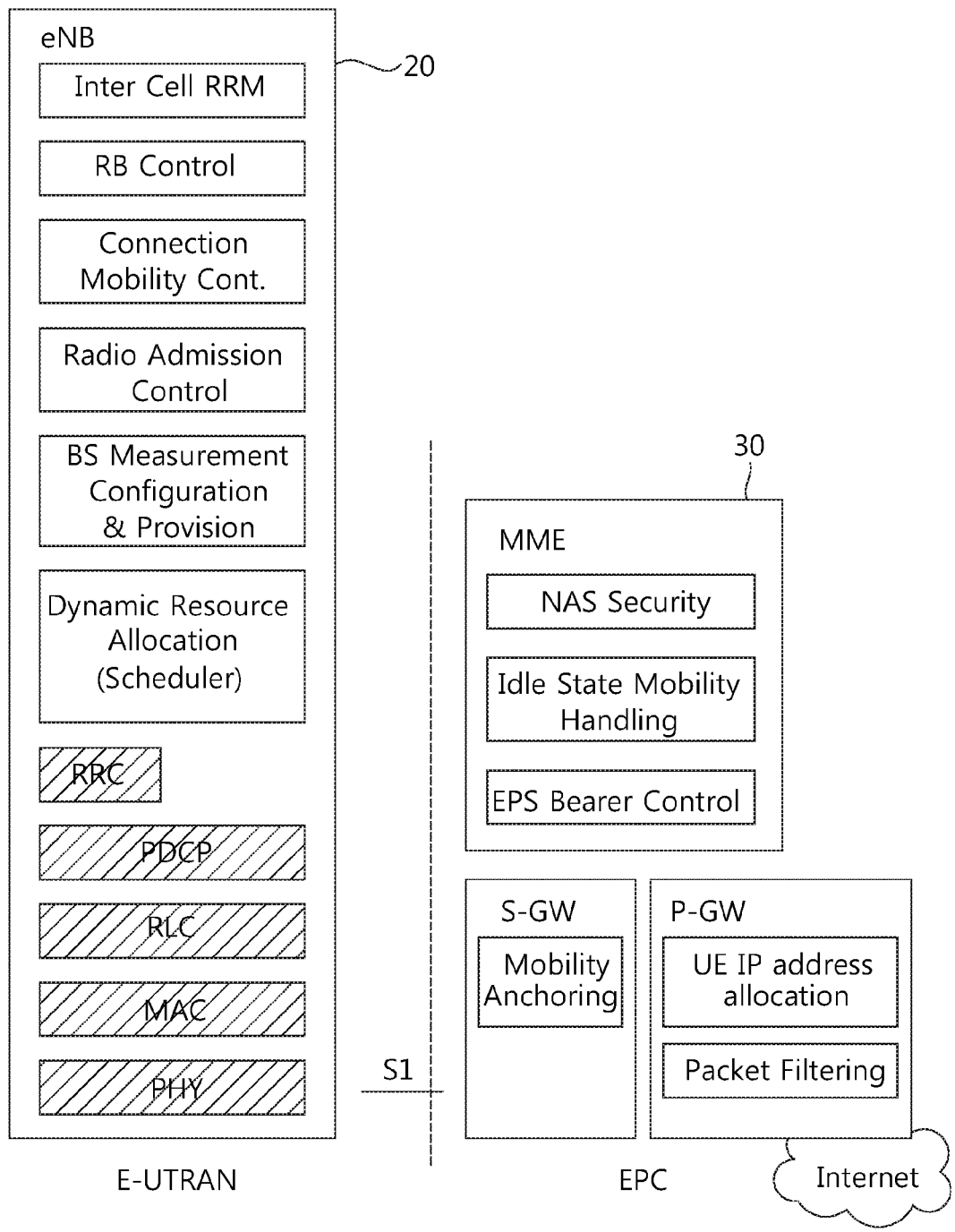
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
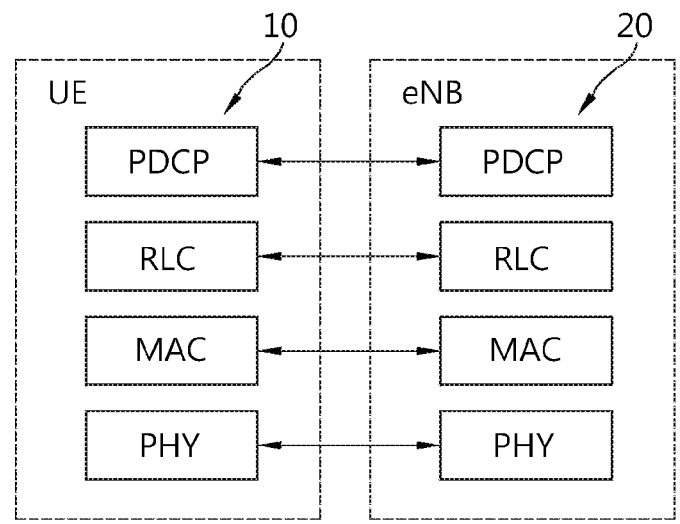
FIG. 3 shows a block diagram of a user plane protocol stack and a control plane protocol stack of an LTE system.
Figure 3:
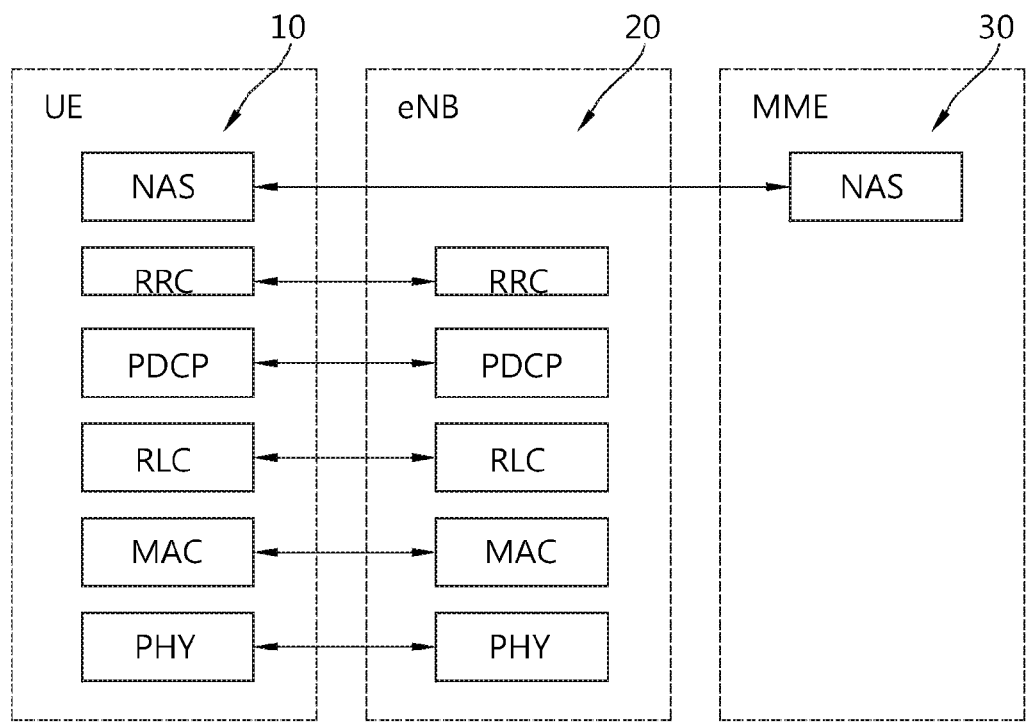

FIG. 3 shows a block diagram of a user plane protocol stack and a control plane protocol stack of an LTE system. FIG. 3-(*a*) shows a block diagram of a user plane protocol stack of an LTE system, and FIG. 3-(*b*) shows a block diagram of a control plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
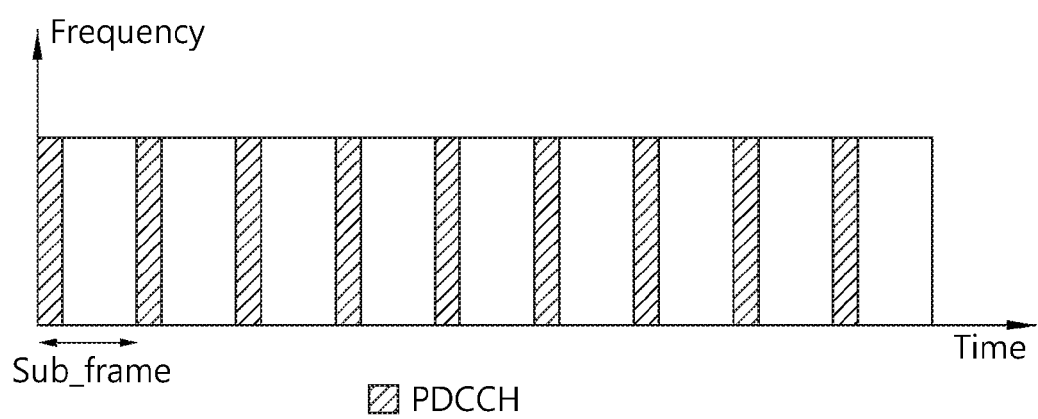
FIG. 4 shows an example of a physical channel structure.

FIG. 4 shows an example of a physical channel structure. A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3-(a), the RLC and MAC layers (terminated in the eNB on the network side) may perform functions such as scheduling, automatic repeat request (ARQ), and hybrid automatic repeat request (HARQ). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI) or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

$$\text{Transmit power} = \text{TransmitPilot} - \text{RxPilot} + \text{ULInterference} + \text{Offset} + \text{SNRRequired}$$

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the UL in the signature.

Carrier aggregation (CA) is described. It may be referred to Section 5.5 of 3GPP TS 36.300 V11.6.0 (2013 June).

In CA, two or more component carriers (CCs) are aggregated in order to support wider transmission bandwidths up to 100 MHz. A UE may simultaneously receive or transmit on one or multiple CCs depending on its capabilities. A UE with single timing advance capability for CA can simultaneously receive and/or transmit on multiple CCs corresponding to multiple serving cells sharing the same timing advance (multiple serving cells grouped in one timing advance group (TAG)). A UE with multiple timing advance capability for CA can simultaneously receive and/or transmit on multiple CCs corresponding to multiple serving cells with different timing advances (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG).

A serving cell is combination of downlink and optionally uplink resources. That is, a serving cell may consist of one DL CC and one UL CC. Alternatively, a serving cell may consist of one DL CC. CA may have a plurality of serving cells. The plurality of serving cells may consist of one primary serving cell (PCell) and at least one secondary serving cell (SCell). PUCCH transmission, random access procedure, etc., may be performed only in the PCell.

Figure 5:
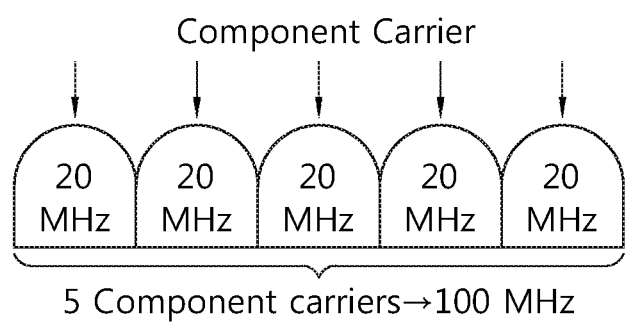
FIG. 5 shows an example of a carrier aggregation of 3GPP LTE-A.

FIG. 5 shows an example of a carrier aggregation of 3GPP LTE-A. Referring to FIG. 5, each CC has a bandwidth of 20 MHz, which is a bandwidth of 3GPP LTE. Up to 5 CCs may be aggregated, so maximum bandwidth of 100 MHz may be configured.

CA is supported for both contiguous and non-contiguous CCs with each CC limited to a maximum of 110 RBs in the frequency domain using the Rel-8/9 numerology.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. It is not possible to configure a UE with more UL CCs than DL CCs. In typical TDD deployments, the number of CCs and the bandwidth of each CC in UL and DL is the same. The number of TAGs that can be configured depends on the TAG capability of the UE.

CCs originating from the same eNB need not to provide the same coverage.

CCs shall be LTE Rel-8/9 compatible. Nevertheless, existing mechanisms (e.g., barring) may be used to avoid Rel-8/9 UEs to camp on a CC.

The spacing between center frequencies of contiguously aggregated CCs shall be a multiple of 300 kHz. This is in order to be compatible with the 100 kHz frequency raster of Rel-8/9 and at the same time preserve orthogonality of the subcarriers with 15 kHz spacing. Depending on the aggregation scenario, the n×300 kHz spacing can be facilitated by insertion of a low number of unused subcarriers between contiguous CCs.

For TDD CA, the downlink/uplink configuration is identical across component carriers in the same band and may be the same or different across component carriers in different bands.

Figure 6:
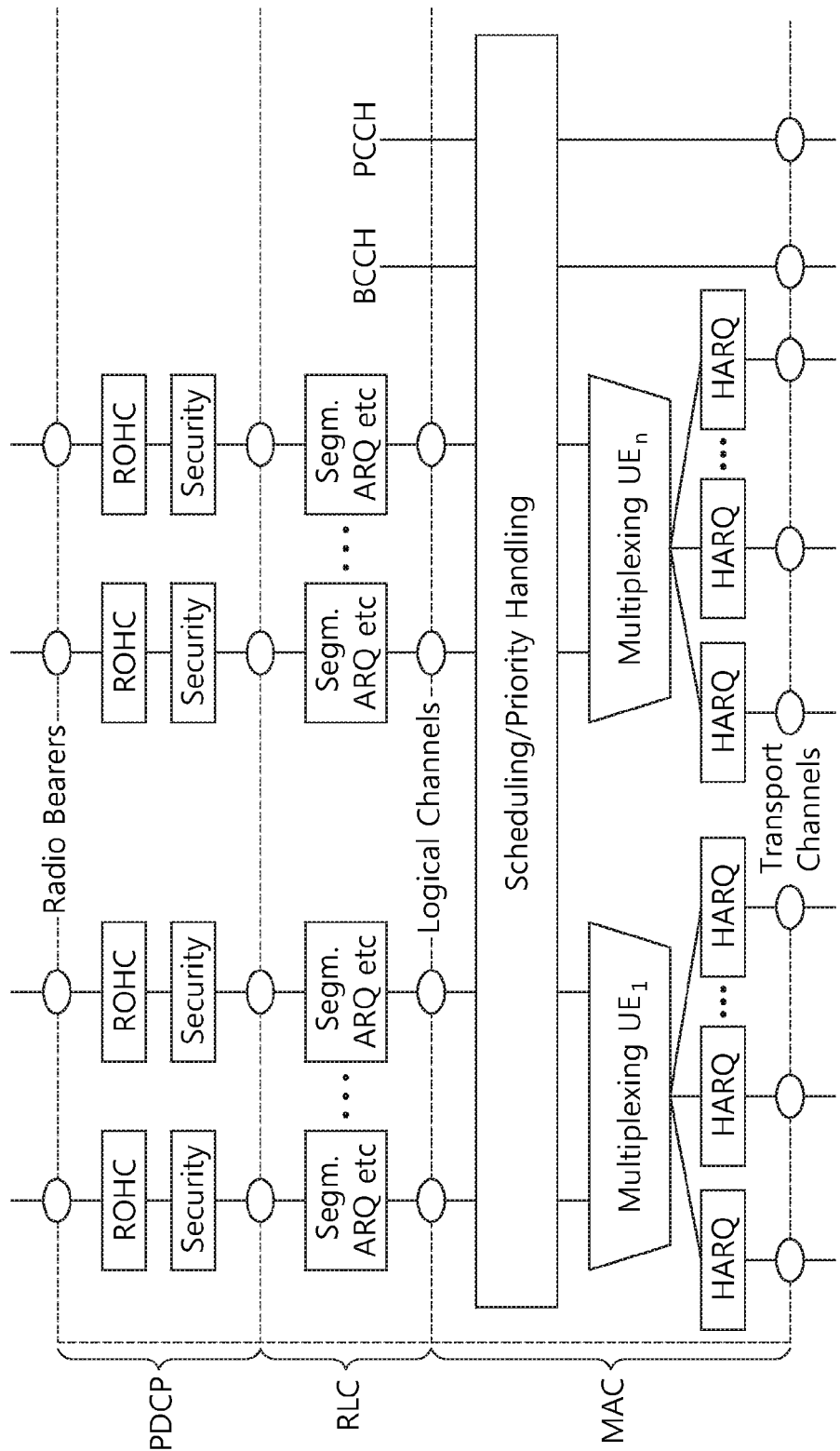
FIG. 6 shows an example of a layer 2 DL structure for CA.
Figure 7:
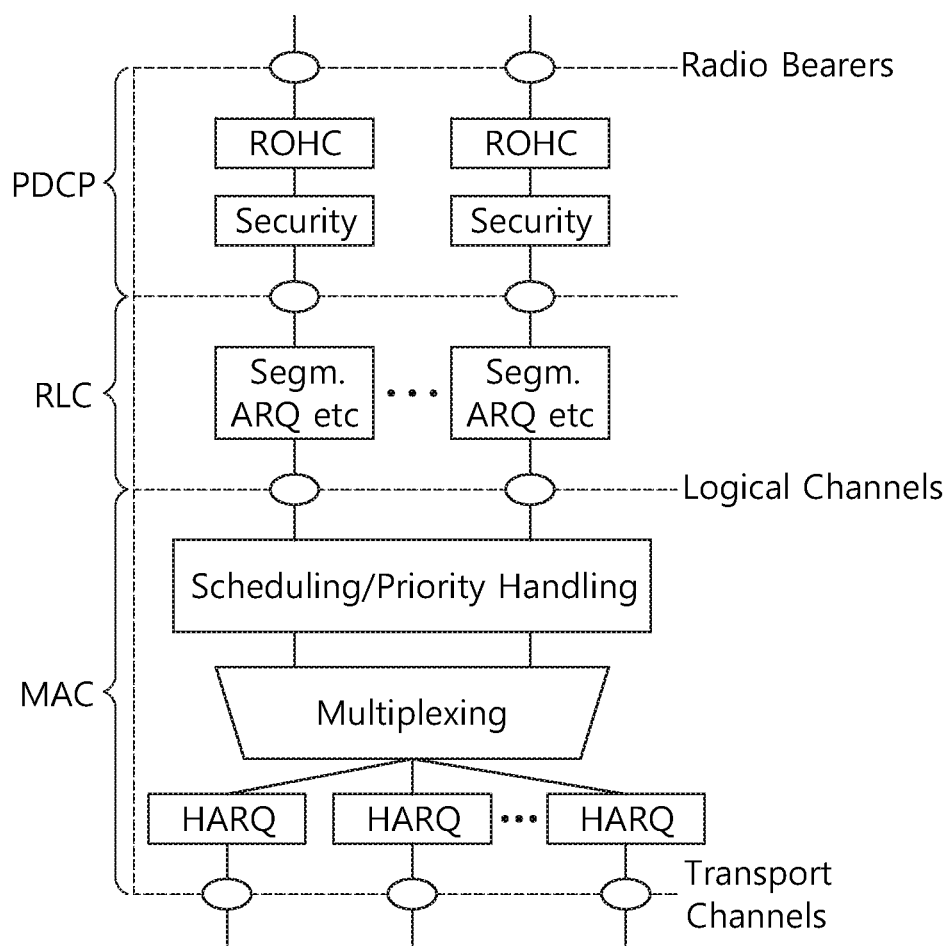
FIG. 7 shows an example of a layer 2 UL structure for CA.

FIG. 6 shows an example of a layer 2 DL structure for CA. FIG. 7 shows an example of a layer 2 UL structure for CA. CA may affect a MAC sublayer of the layer 2. For example, since CA uses a plurality of CCs, and each HARQ entity manages each CC, the MAC sublayer shall perform operations related to a plurality of HARQ entities. Further, each HARQ entity processes a transport block independently. Therefore, in CA, a plurality of transport blocks may be transmitted or received at the same time through a plurality of CCs.

Small cell enhancement is described. It may be referred to 3GPP TR 36.932 V12.0.0 (2012 December).

Figure 8:
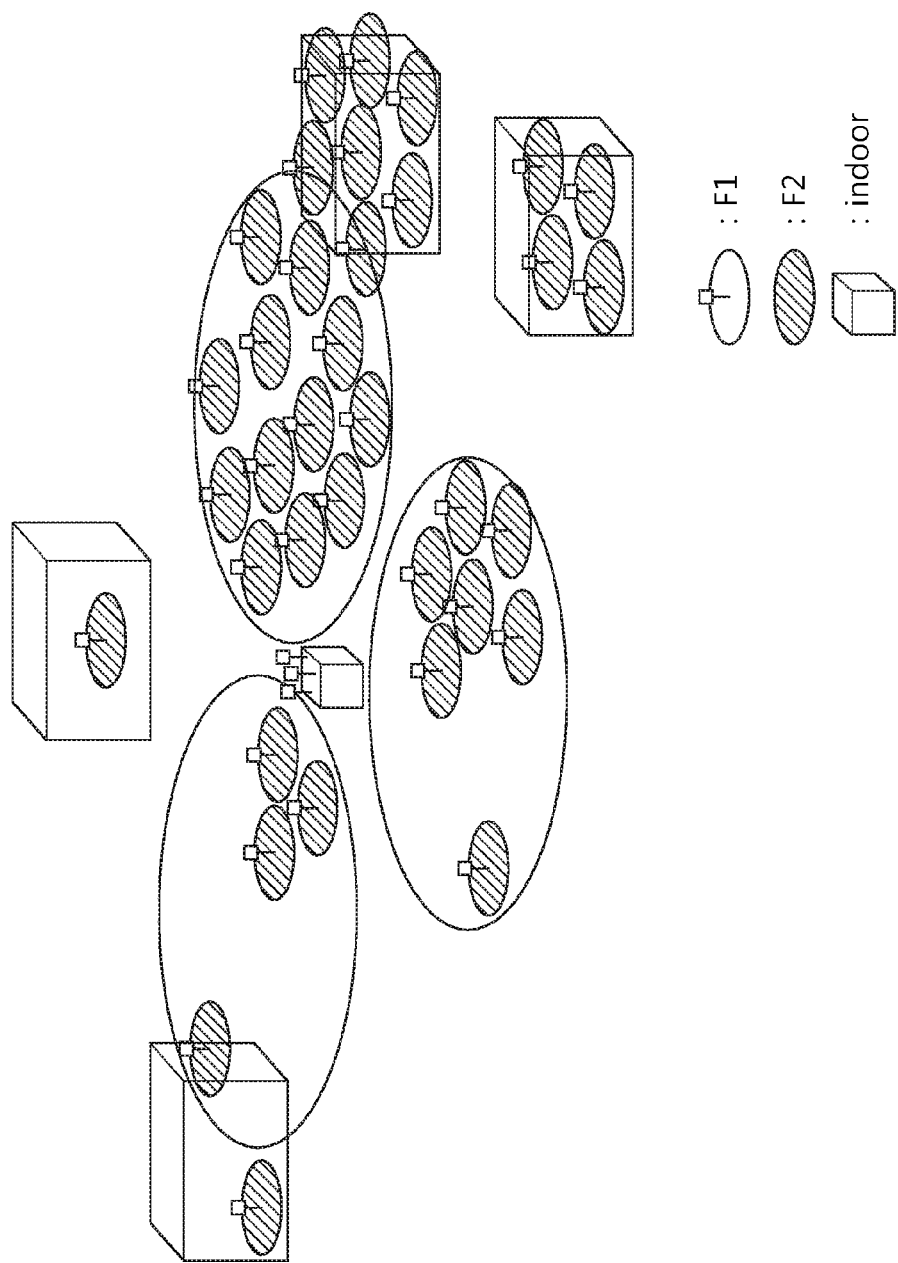
FIG. 8 shows deployment scenarios of small cells with/without macro coverage.

FIG. 8 shows deployment scenarios of small cells with/ without macro coverage. Small cell enhancement should target both with and without macro coverage, both outdoor and indoor small cell deployments and both ideal and non-ideal backhaul. Both sparse and dense small cell deployments should be considered.

Referring to FIG. 8, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:

where the UE is in coverage of both the macro cell and the small cell simultaneously where the UE is not in coverage of both the macro cell and the small cell simultaneously.

Also, the deployment scenario where small cell nodes are not deployed under the coverage of one or more overlaid E-UTRAN macro-cell layer(s) may be considered.

Small cell enhancement should target both outdoor and indoor small cell deployments. The small cell nodes could be deployed indoors or outdoors, and in either case could provide service to indoor or outdoor UEs.

For indoor UE, only low UE speed (0-3 km/h) is targeted. For outdoor, not only low UE speed, but also medium UE speed (up to 30 km/h and potentially higher speeds) is targeted.

Both throughput and mobility/connectivity shall be used as performance metric for both low and medium mobility. Cell edge performance (e.g. 5%-tile CDF point for user throughput) and power efficiency (of both network and UE) are also used as metrics.

Both ideal backhaul (i.e., very high throughput and very low latency backhaul such as dedicated point-to-point connection using optical fiber, line-of-sight (LOS) microwave) and non-ideal backhaul (i.e., typical backhaul widely used in the market such as xDSL, non-LOS (NLOS) microwave, and other backhauls like relaying) should be studied. The performance-cost trade-off should be taken into account.

For interfaces between macro and small cell, as well as between small cells, the studies should first identify which kind of information is needed or beneficial to be exchanged between nodes in order to get the desired improvements before the actual type of interface is determined. And if direct interface should be assumed between macro and small cell, as well as between small cell and small cell, X2 interface can be used as a starting point.

Small cell enhancement should consider sparse and dense small cell deployments. In some scenarios (e.g., hotspot indoor/outdoor places, etc), single or a few small cell node(s) are sparsely deployed, e.g., to cover the hotspot(s).

Meanwhile, in some scenarios (e.g., dense urban, large shopping mall, etc), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e., a small cell cluster.

Furthermore, smooth future extension/scalability (e.g., from sparse to dense, from small-area dense to large-area dense, or from normal-dense to super-dense) should be considered. For mobility/connectivity performance, both sparse and dense deployments should be considered with equal priority.

Both synchronized and un-synchronized scenarios should be considered between small cells as well as between small cells and macro cell(s). For specific operations, e.g., interference coordination, carrier aggregation and inter-eNB coordinated multi-point (COMP), small cell enhancement can benefit from synchronized deployments with respect to small cell search/measurements and interference/resource management. Therefore time synchronized deployments of small cell clusters are prioritized in the study and new means to achieve such synchronization shall be considered.

Small cell scenarios for evaluation are described.

Figure 9:
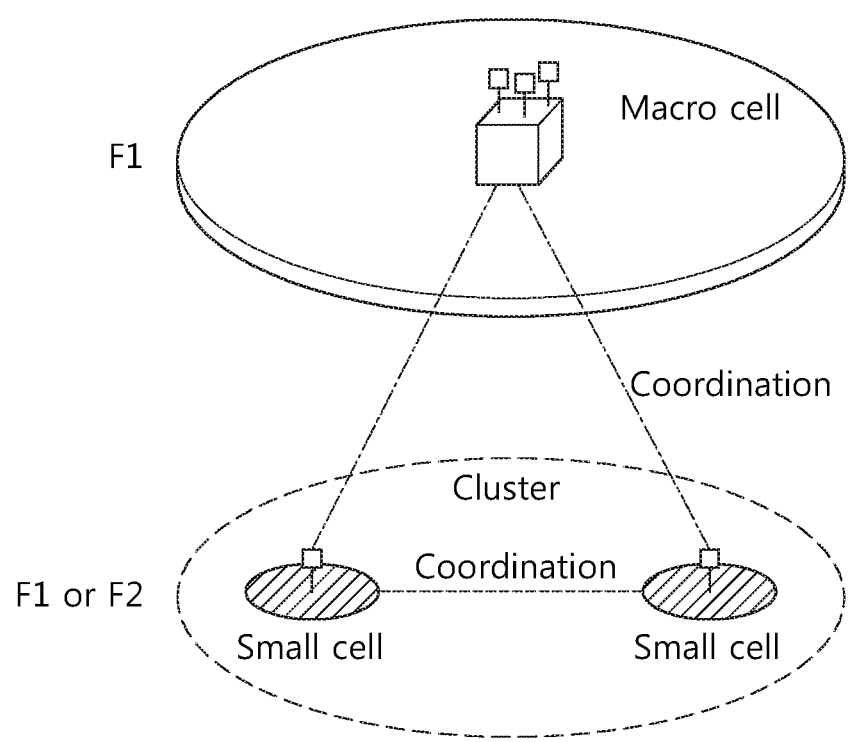
FIG. 9 shows an example of small cell deployment scenario for evaluation.

FIG. 9 shows an example of small cell deployment scenario for evaluation. The small cell deployment scenario described in FIG. 9 is a common design for small cell scenarios for evaluation purpose. It is noted that the addition of scenarios for evaluation of higher-layer aspects may be considered depending on the outcome of the higher-layer studies. Referring to FIG. 9, a macro cell may operate at frequency F1. An overlaid macro cell may be present or not. Small cells, which constitute a small cell cluster, may operate at frequency F1 or F2. The small cells in the small cell cluster may coordinate with each other. The macro cell and the small cells may coordinate with each other.

Figure 10:
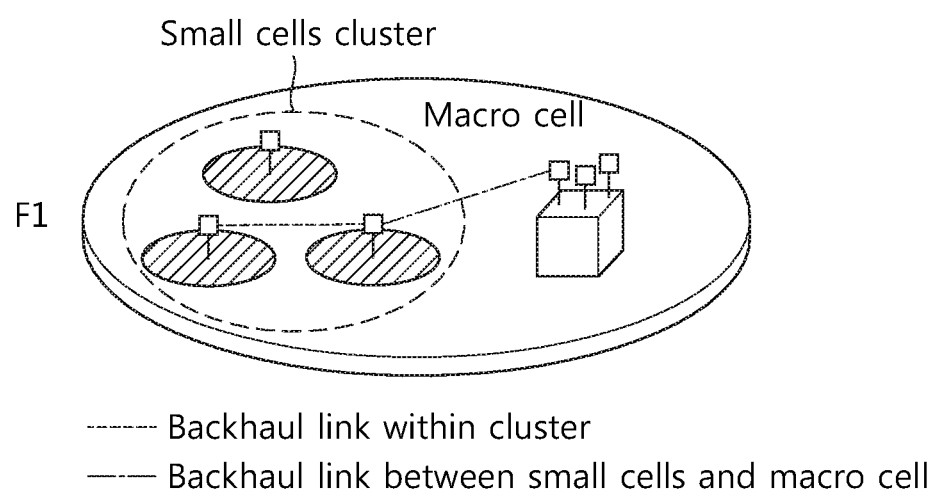
FIG. 10 shows an example of small cell deployment scenario.

FIG. 10 shows an example of small cell deployment scenario. Referring to FIG. 10, small cells are deployed in the presence of an overlaid macro network. The macro cell and the small cells are deployed using the same frequency, i.e., F1. Further, the macro cell and the small cells are deployed in outdoor. Users may be distributed both for outdoor and indoor. Further, a small cell cluster may be considered. The small cell cluster may be denser than scenarios considered for LTE rel-10 enhanced inter-cell interference coordination (eICIC), 3GPP rel-11 further enhanced ICIC (feICIC)/coordinated multi-point (CoMP) transmission/reception. Further, both ideal backhaul and non-ideal backhaul may be considered for an interface between the small cells within the same small cell cluster, or an interface between the small cell cluster and at least one macro eNB. Further, non-ideal backhaul may be assumed for all other interfaces.

Figure 11:
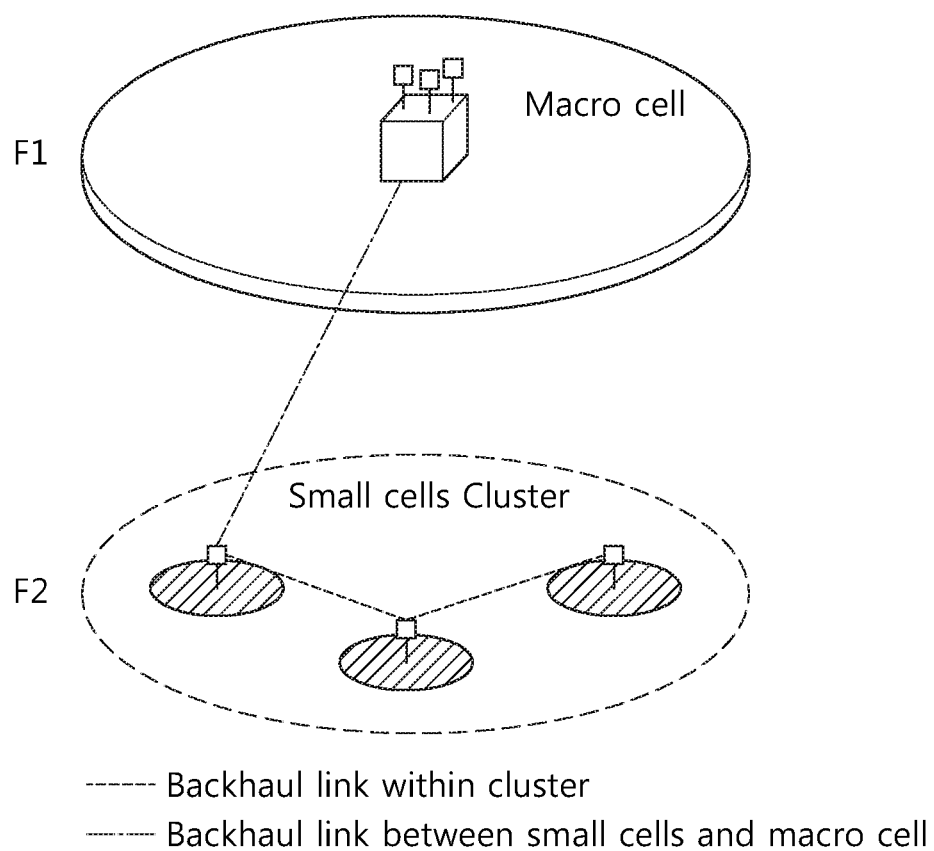
FIG. 11 shows another example of small cell deployment scenario.

FIG. 11 shows another example of small cell deployment scenario. Referring to FIG. 11, small cells are deployed in the presence of an overlaid macro network. The macro cell and the small cells are deployed using different frequencies. That is, the macro cell uses frequency F1, and the small cells use frequency F2. Further, the macro cell and the small cells are deployed in outdoor. Users may be distributed both for outdoor and indoor. Further, a small cell cluster may be considered. The small cell cluster may be denser than scenarios considered for LTE rel-10 eICIC, 3GPP rel-11 feICIC/CoMP transmission/reception. Further, both ideal backhaul and non-ideal backhaul may be considered for an interface between the small cells within the same small cell cluster, or an interface between the small cell cluster and at least one macro eNB. Further, non-ideal backhaul may be assumed for all other interfaces.

Figure 12:
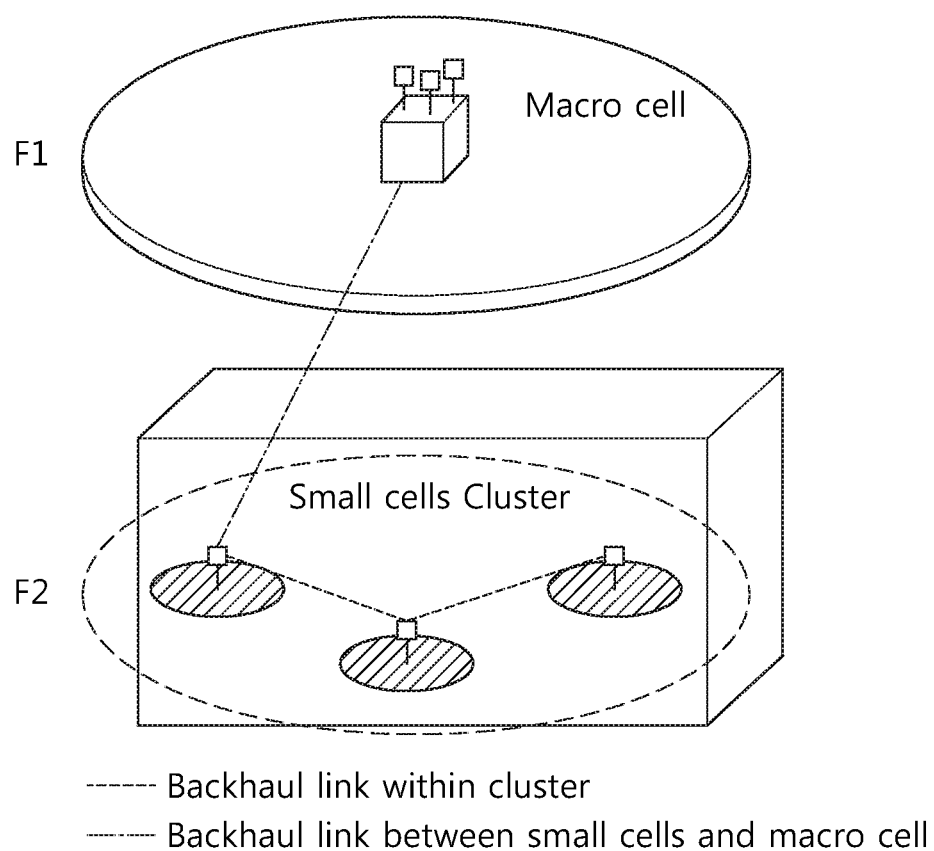
FIG. 12 shows another example of small cell deployment scenario.

FIG. 12 shows another example of small cell deployment scenario. Referring to FIG. 12, small cells are deployed in the presence of an overlaid macro network. The macro cell and the small cells are deployed using different frequencies. That is, the macro cell uses frequency F1, and the small cells use frequency F2. Further, the macro cell is deployed in outdoor, and the small cells are deployed in indoor. Users may be distributed both for outdoor and indoor. Further, a small cell cluster may be considered. The small cell cluster may be denser than scenarios considered for LTE rel-10 eICIC, 3GPP rel-11 feICIC/CoMP transmission/reception. Alternatively, a sparse scenario may be considered such as the indoor hotspot scenario evaluated for LTE rel-10 scenarios. Further, both ideal backhaul and non-ideal backhaul may be considered for an interface between the small cells within the same small cell cluster, or an interface between the small cell cluster and at least one macro eNB. Further, non-ideal backhaul may be assumed for all other interfaces.

Figure 13:
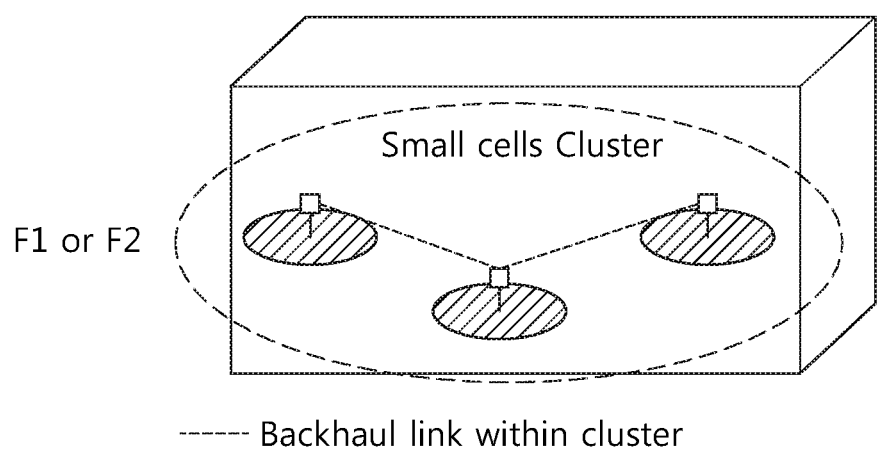
FIG. 13 shows another example of small cell deployment scenario.

FIG. 13 shows another example of small cell deployment scenario. Referring to FIG. 13, macro cell coverage is not present. Small cells are deployed using frequency F1 or F2. Further, the small cells are deployed in indoor. Users may be distributed both for outdoor and indoor. Further, a small cell cluster may be considered. The small cell cluster may be denser than scenarios considered for LTE rel-10 eICIC, 3GPP rel-11 feICIC/CoMP transmission/reception. Alternatively, a sparse scenario may be considered such as the indoor hotspot scenario evaluated for LTE rel-10 scenarios. Further, both ideal backhaul and non-ideal backhaul may be considered for an interface between the small cells within the same small cell cluster. Further, non-ideal backhaul may be assumed for all other interfaces.

Within scenarios described in FIG. 12 and FIG. 13, all features may at least be evaluated in the dense cases. This may not preclude evaluation being carried out equally in other cases for particular features. It may be recommended that spectral efficiency enhancements should be evaluated in sparse cases as well.

Dual connectivity is described.

Figure 14:
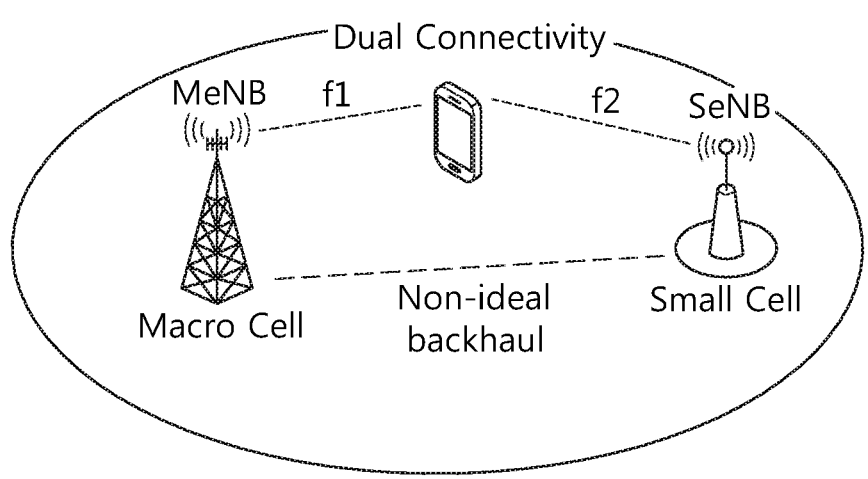
FIG. 14 shows an example of dual connectivity to a macro cell and a small cell.

FIG. 14 shows an example of dual connectivity to a macro cell and a small cell. Referring to FIG. 14, the UE is connected to both the macro cell and the small cell. A macro cell eNB serving the macro cell is the MeNB in dual connectivity, and a small cell eNB serving the small cell is the SeNB in dual connectivity. The MeNB is an eNB which terminates at least S1-MME and therefore act as mobility anchor towards the CN in dual connectivity. If a macro eNB exists, the macro eNB may function as the MeNB, generally. The SeNB is an eNB providing additional radio resources for the UE, which is not the MeNB, in dual connectivity. The SeNB is responsible for transmitting best effort (BE) type traffic, while the MeNB is responsible for transmitting other types of traffic such as VoIP, streaming data, or signaling data. The interface between the MeNB and SeNB is called Xn interface. The Xn interface is assumed to be non-ideal, i.e., the delay in Xn interface could be up to 60 ms.

Figure 15:
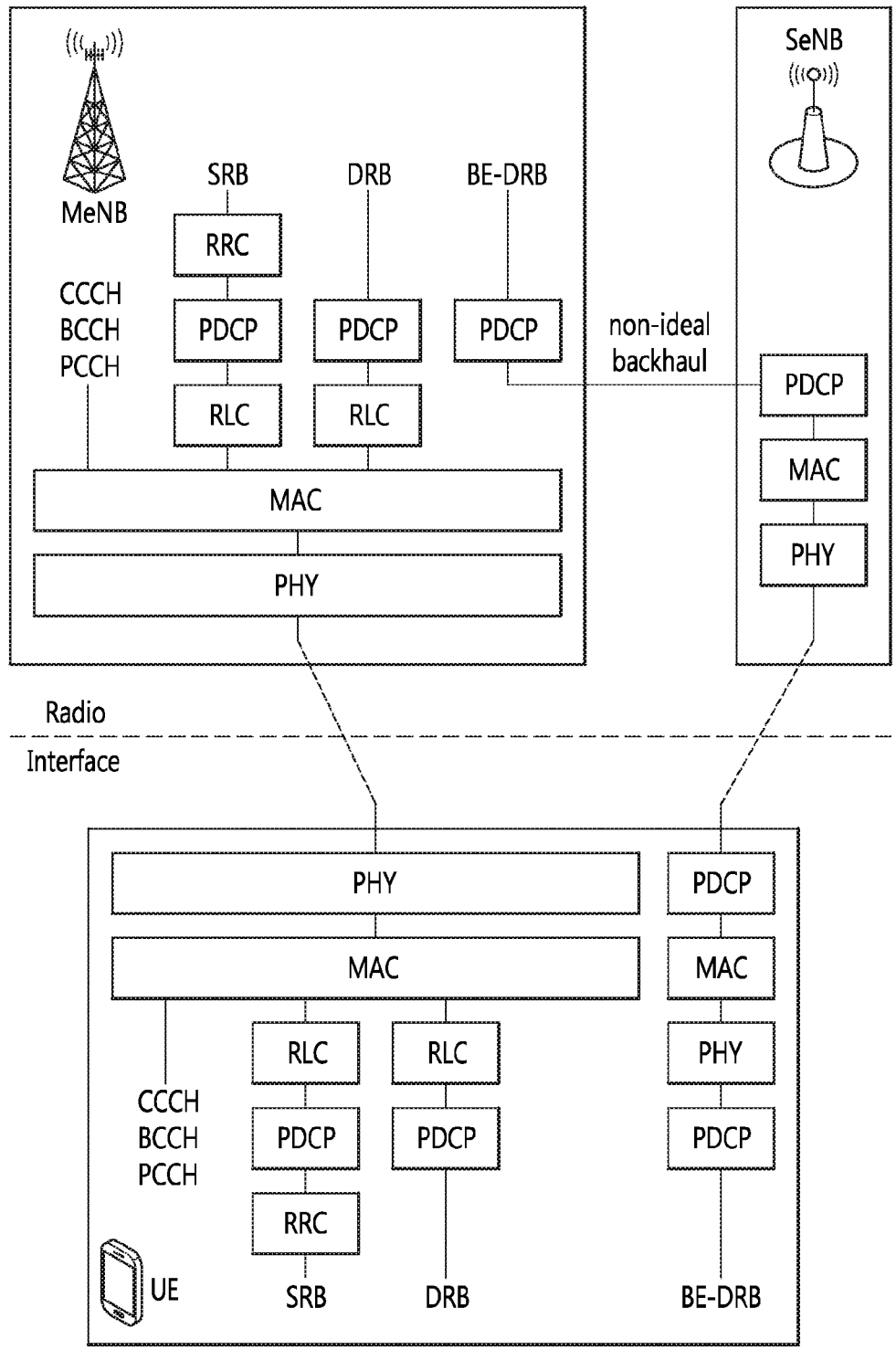
FIG. 15 shows an example of a protocol architecture supporting dual connectivity.

FIG. 15 shows an example of a protocol architecture supporting dual connectivity. To support dual connectivity, various protocol architectures have been studied. Referring to FIG. 15, PDCP and RLC entities are located in different network nodes, i.e., PDCP entities in the MeNB and RLC entities in the SeNB. In the UE side, the protocol architecture is same as the prior art except that the MAC entity is setup for each eNB (i.e., the MeNB and SeNB).

Random access (RA) procedure is described. It may be referred to Section 10.1.5 of 3GPP TS 36.300 V11.6.0 (2013 June).

The random access procedure is characterized by:
Common procedure for FDD and TDD;
One procedure irrespective of cell size and the number of serving cells when carrier aggregation (CA) is configured.

The random access procedure is performed for the following events related to the primary cell (PCell):
Initial access from RRC_IDLE;
RRC connection re-establishment procedure;
Handover;
DL data arrival during RRC_CONNECTED requiring random access procedure (e.g., when UL synchronization status is "non-synchronized");
UL data arrival during RRC_CONNECTED requiring random access procedure (e.g., when UL synchronization status is "non-synchronized" or there are no PUCCH resources for scheduling request (SR) available);
For positioning purpose during RRC_CONNECTED requiring random access procedure (e.g., when timing advance is needed for UE positioning);

The random access procedure is also performed on a SCell to establish time alignment for the corresponding secondary TAG (sTAG).

Furthermore, the random access procedure takes two distinct forms:
Contention based (applicable to first five events);
Non-contention based (applicable to only handover, DL data arrival, positioning and obtaining timing advance alignment for a sTAG).

Normal DL/UL transmission can take place after the random access procedure.

A relay node (RN) supports both contention-based and non-contention-based random access. When an RN performs the random access procedure, it suspends any current RN subframe configuration, meaning it temporarily disregards the RN subframe configuration. The RN subframe configuration is resumed at successful random access procedure completion.

Figure 16:
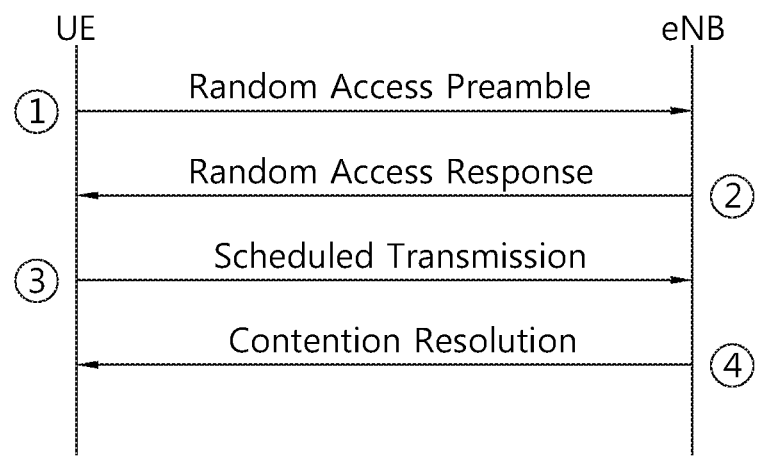
FIG. 16 shows a contention based random access procedure.

FIG. 16 shows a contention based random access procedure.

The four steps of the contention based random access procedures are:

1) Random access preamble on RACH in uplink (message 1): There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds is broadcast on system information.

2) Random access response generated by MAC on DL-SCH (message 2): The message 2 may be semi-synchronous (within a flexible window of which the size is one or more TTI) with message 1. The message 2 may not use HARQ. The message 2 may be addressed to random access radio network temporary identity (RA-RNTI) on PDCCH. The message 2 may convey at least RA-preamble identifier, timing alignment information for the primary timing advance group (pTAG), initial UL grant and assignment of temporary cell RNTI (C-RNTI) (which may or may not be made permanent upon contention resolution). The message 2 may be intended for a variable number of UEs in one DL-SCH message.

3) First scheduled UL transmission on UL-SCH (message 3): The message 3 may use HARQ. Size of the transport blocks depends on the UL grant conveyed in step 2 and is at least 80 bits. For initial access, the message 3 may convey the RRC Connection Request generated by the RRC layer and transmitted via CCCH, or may convey at least NAS UE identifier but no NAS message. For RRC connection re-establishment procedure, the message 3 may convey the RRC connection re-establishment request generated by the RRC layer and transmitted via CCCH. The message 3 may not contain any NAS message. After handover, in the target cell, the message 3 may convey the ciphered and integrity protected RRC handover confirm generated by the RRC layer and transmitted via DCCH, or may convey the C-RNTI of the UE (which was allocated via the handover command). The message 3 may include an uplink buffer status report when possible. For other events, the message 3 may convey at least the C-RNTI of the UE.

4) Contention resolution on DL (message 4): Early contention resolution shall be used, i.e., eNB does not wait for NAS reply before resolving contention. The message 4 may be not synchronized with message 3. HARQ is supported. The message 4 may be addressed to the temporary C-RNTI on PDCCH for initial access and after radio link failure, and/or the C-RNTI on PDCCH for UE in RRC_CONNECTED. HARQ feedback is transmitted only by the UE which detects its own UE identity, as provided in message 3, echoed in the contention resolution message.

The temporary C-RNTI is promoted to C-RNTI for a UE which detects RA success and does not already have a C-RNTI; it is dropped by others. A UE which detects RA success and already has a C-RNTI, resumes using its C-RNTI.

When CA is configured, the first three steps of the contention based random access procedures occur on the PCell while contention resolution (step 4) can be cross-scheduled by the PCell.

Random access procedure is described in more detail. It may be referred to Section 5.1 of 3GPP TS 36.321 V11.3.0 (2013 June).

First, random access procedure initialization is described. The random access procedure is initiated by a PDCCH order or by the MAC sublayer itself. Random access procedure on an SCell shall only be initiated by a PDCCH order. If a UE receives a PDCCH transmission consistent with a PDCCH order masked with its C-RNTI, and for a specific serving cell, the UE shall initiate a random access procedure on this serving cell. For random access on the PCell a PDCCH order or RRC optionally indicate the ra-PreambleIndex and the ra-PRACH-MaskIndex; and for random access on an SCell, the PDCCH order indicates the ra-PreambleIndex with a value different from 000000 and the ra-PRACH-MaskIndex. For the pTAG preamble transmission on PRACH and reception of a PDCCH order are only supported for PCell.

There is only one random access procedure ongoing at any point in time. If the UE receives a request for a new random access procedure while another is already ongoing, it is up to UE implementation whether to continue with the ongoing procedure your start with the new procedure.

Random access resource selection is described. The random access resource selection procedure shall be performed as follows:

If ra-PreambleIndex (random access preamble) and ra-PRACH-MaskIndex (PRACH mask index) have been explicitly signalled and ra-PreambleIndex is not 000000:
  the random access preamble and the PRACH mask index are those explicitly signalled.
else the random access preamble shall be selected by the UE as follows:
  If Msg3 has not yet been transmitted, the UE shall:
    if random access preambles group B exists and if the potential message size (data available for transmission plus MAC header and, where required, MAC control elements) is greater than messageSizeGroupA and if the pathloss is less than $P_{CMAX,c}$ (of the serving cell performing the random access procedure)−preambleInitialReceivedTargetPower−deltaPreambleMsg3−messagePowerOffsetGroupB, then:
      select the random access preambles group B;
    else:
      select the random access preambles group A.
  else, if Msg3 is being retransmitted, the UE shall:
    select the same group of random access preambles as was used for the preamble transmission attempt corresponding to the first transmission of Msg3.
  randomly select a random access preamble within the selected group. The random function shall be such that each of the allowed selections can be chosen with equal probability;
  set PRACH mask index to 0.
determine the next available subframe containing PRACH permitted by the restrictions given by the prach-ConfigIndex, the PRACH mask index and physical layer timing requirements (a UE may take into account the possible occurrence of measurement gaps when determining the next available PRACH subframe);
if the transmission mode is TDD and the PRACH mask index is equal to zero:
  if ra-PreambleIndex was explicitly signalled and it was not 000000 (i.e., not selected by MAC):
    randomly select, with equal probability, one PRACH from the PRACHs available in the determined subframe.
  else:
    randomly select, with equal probability, one PRACH from the PRACHs available in the determined subframe and the next two consecutive subframes.
else:
  determine a PRACH within the determined subframe in accordance with the requirements of the PRACH mask index.
proceed to the transmission of the random access preamble.

Random access preamble transmission is described. The random access procedure shall be performed as follows:
  set PREAMBLE_RECEIVED_TARGET_POWER to preambleInitialReceivedTargetPower+DELTA_PREAMBLE+(PREAMBLE_TRANSMISSION_COUNTER−1)*powerRampingStep;
  instruct the physical layer to transmit a preamble using the selected PRACH, corresponding RA-RNTI, preamble index and PREAMBLE_RECEIVED_TARGET_POWER.

Random access response reception is described. Once the random access preamble is transmitted and regardless of the possible occurrence of a measurement gap, the UE shall monitor the PDCCH of the PCell for random access Response(s) identified by the RA-RNTI defined below, in the RA Response window which starts at the subframe that contains the end of the preamble transmission plus three subframes and has length ra-ResponseWindowSize subframes. The RA-RNTI associated with the PRACH in which the random access preamble is transmitted, is computed as RA-RNTI=1+t_id+10*f_id, where t_id is the index of the first subframe of the specified PRACH (0≤t_id<10), and f_id is the index of the specified PRACH within that subframe, in ascending order of frequency domain (0≤f_id<6). The UE may stop monitoring for random access response(s) after successful reception of a random access response containing random access preamble identifiers that matches the transmitted random access preamble.

If a downlink assignment for this TTI has been received on the PDCCH for the RA-RNTI and the received TB is successfully decoded, the UE shall regardless of the possible occurrence of a measurement gap:
  if the random access response contains a backoff indicator subheader:
    set the backoff parameter value in the UE as indicated by the BI field of the backoff indicator subheader.
  else, set the backoff parameter value in the UE to 0 ms.
  if the random access response contains a random access preamble identifier corresponding to the transmitted random access preamble, the UE shall:
    consider this random access response reception successful and apply the following actions for the serving cell where the random access preamble was transmitted:
      process the received timing advance command;
      indicate the preambleInitialReceivedTargetPower and the amount of power ramping applied to the latest preamble transmission to lower layers (i.e., (PREAMBLE_TRANSMISSION_COUNTER−1)*powerRampingStep);
      process the received UL grant value and indicate it to the lower layers;
    if ra-PreambleIndex was explicitly signalled and it was not 000000 (i.e., not selected by MAC):
      consider the random access procedure successfully completed.
    else, if the random access preamble was selected by UE MAC:
      set the temporary C-RNTI to the value received in the random access response message no later than at the time of the first transmission corresponding to the UL grant provided in the random access response message;
      if this is the first successfully received random access response within this random access procedure:
        if the transmission is not being made for the CCCH logical channel, indicate to the multiplexing and assembly entity to include a C-RNTI MAC control element in the subsequent uplink transmission;
        obtain the MAC PDU to transmit from the "Multiplexing and assembly" entity and store it in the Msg3 buffer.
When an uplink transmission is required, e.g., for contention resolution, the eNB should not provide a grant smaller than 56 bits in the Random Access Response.
If within a random access procedure, an uplink grant provided in the random access response for the same group of random access preambles has a different size than the first uplink grant allocated during that random access procedure, the UE behavior is not defined.

If no random access response is received within the RA Response window, or if none of all received random access responses contains a random access preamble identifier corresponding to the transmitted random access preamble, the random access response reception is considered not successful and the UE shall:
increment PREAMBLE_TRANSMISSION_COUNTER by 1;
If PREAMBLE_TRANSMISSION_COUNTER=preambleTransMax+1:
if the random access preamble is transmitted on the PCell:
indicate a random access problem to upper layers;
if the random access preamble is transmitted on an SCell:
consider the random access procedure unsuccessfully completed.
if in this random access procedure, the random access preamble was selected by MAC:
based on the backoff parameter in the UE, select a random backoff time according to a uniform distribution between 0 and the backoff parameter value;
delay the subsequent random access transmission by the backoff time;
proceed to the selection of a random access resource.

Contention resolution is described. Contention resolution is based on either C-RNTI on PDCCH of the PCell or UE contention resolution identity on DL-SCH.

Once Msg3 is transmitted, the UE shall:
start mac-ContentionResolutionTimer and restart mac-ContentionResolutionTimer at each HARQ retransmission;
regardless of the possible occurrence of a measurement gap, monitor the PDCCH until mac-ContentionResolutionTimer expires or is stopped;
if notification of a reception of a PDCCH transmission is received from lower layers, the UE shall:
if the C-RNTI MAC control element was included in Msg3:
if the random access procedure was initiated by the MAC sublayer itself and the PDCCH transmission is addressed to the C-RNTI and contains an UL grant for a new transmission; or
if the random access procedure was initiated by a PDCCH order and the PDCCH transmission is addressed to the C-RNTI:
consider this contention resolution successful;
stop mac-ContentionResolutionTimer;
discard the temporary C-RNTI;
consider this random access procedure successfully completed.
else if the CCCH SDU was included in Msg3 and the PDCCH transmission is addressed to its Temporary C-RNTI:
if the MAC PDU is successfully decoded:
stop mac-ContentionResolutionTimer;
if the MAC PDU contains a UE contention resolution identity MAC control element; and
if the UE contention resolution identity included in the MAC control element matches the CCCH SDU transmitted in Msg3:
consider this contention resolution successful and finish the disassembly and demultiplexing of the MAC PDU;
set the C-RNTI to the value of the temporary C-RNTI;
discard the Temporary C-RNTI;
consider this Random Access procedure successfully completed.
else
discard the temporary C-RNTI;
consider this contention resolution not successful and discard the successfully decoded MAC PDU.
if mac-ContentionResolutionTimer expires:
discard the temporary C-RNTI;
consider the contention resolution not successful.
if the contention resolution is considered not successful the UE shall:
flush the HARQ buffer used for transmission of the MAC PDU in the Msg3 buffer;
increment PREAMBLE_TRANSMISSION_COUNTER by 1;
If PREAMBLE_TRANSMISSION_COUNTER=preambleTransMax+1
indicate a random access problem to upper layers.
based on the backoff parameter in the UE, select a random backoff time according to a uniform distribution between 0 and the backoff parameter Value;
delay the subsequent random access transmission by the backoff time;
proceed to the selection of a random access resource.

Completion of the random access procedure is described. At completion of the random access procedure, the UE shall:
discard explicitly signalled ra-PreambleIndex and ra-PRACH-MaskIndex, if any;
flush the HARQ buffer used for transmission of the MAC PDU in the Msg3 buffer.

In addition, the RN shall resume the suspended RN subframe configuration, if any.

Figure 17:
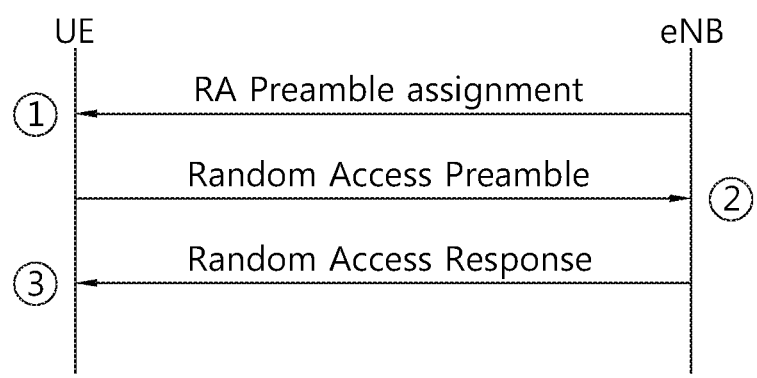
FIG. 17 shows a non-contention based random access procedure.

FIG. 17 shows a non-contention based random access procedure.

The three steps of the non-contention based random access procedures are:

0) Random access preamble assignment via dedicated signaling in DL: The eNB assigns to the UE a non-contention random access preamble (a random access preamble not within the set sent in broadcast signaling). The non-contention random access preamble may be signaled via HO command generated by target eNB and sent via source eNB for handover, or PDCCH in case of DL data arrival or positioning, or PDCCH for initial UL time alignment for a sTAG.

1) Random access preamble on RACH in uplink (message 1): The UE transmits the assigned non-contention random access preamble.

2) Random access response on DL-SCH (message 2): The message 2 may be semi-synchronous (within a flexible window of which the size is two or more TTIs) with message 1. The message 2 may not use HARQ. The message 2 may be addressed to RA-RNTI on PDCCH. The message 2 may convey at least timing alignment information and initial UL grant for handover, timing alignment information for DL data arrival, RA-preamble identifier. The message 2 may be intended for one or multiple UEs in one DL-SCH message.

When performing non-contention based random access on the PCell while CA is configured, the random access preamble assignment via PDCCH of step 0, step 1 and 2 of the non-contention based random access procedure occur on the PCell. In order to establish timing advance for a sTAG, the eNB may initiate a non-contention based random access procedure with a PDCCH order (step 0) that is sent on a scheduling cell of activated SCell of the sTAG. Preamble transmission (step 1) is on the indicated SCell and random access response (step 2) takes place on PCell.

When performing an RA procedure, the UE may count the number of the RA preamble transmission until the RA procedure is completed. If the number of the RA preamble transmissions reaches the maximum number configured by the eNB, the MAC layer of the UE may indicate a RA problem to the RRC layer of the UE. Upon receiving this indication, the RRC layer of the UE may initiate an RRC connection re-establishment.

If the UE supports dual connectivity, and is connected to both the MeNB and the SeNB, it may require to support a contention based RA procedure for the SeNB. During the contention based RA procedure, the RA problem described above may occur. Because the UE has the connection to the MeNB, the RRC connection re-establishment due to the RA problem from the SeNB is unnecessary. Also, the UE may need to stop the UL transmission on the SeNB when the RA problem occurs, and need to report the RA problem to the MeNB.

Hereinafter, a method for performing a random access procedure according to an embodiment of the present invention is described. According to the present invention, in order to solve the RA problem during the RA procedure, the UE may stop UL transmission and may not trigger RRC connection re-establishment if it is determined that the number of RA preamble transmissions reaches the maximum number.

Figure 18:
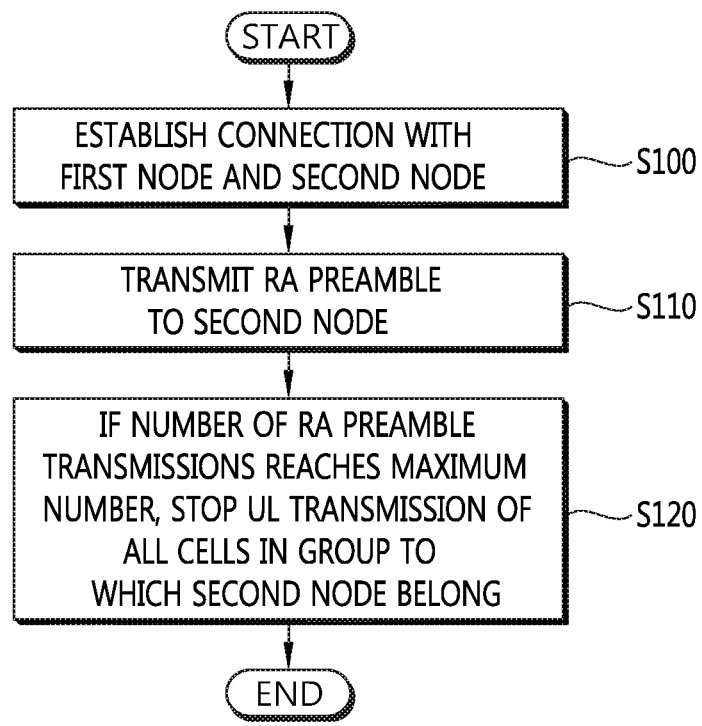
FIG. 18 shows an example of a method for performing a random access procedure according to an embodiment of the present invention.

FIG. 18 shows an example of a method for performing a random access procedure according to an embodiment of the present invention.

In step S100, the UE establishes connection with a first node and a second node. In step S110, the UE transmits an RA preamble to the second node. The RA preamble may be randomly selected from a set of RA preambles by the UE. In this case, the RA procedure may be only contention based RA procedure. Alternatively, the RA preamble is assigned by the eNB. In this case, the RA procedure may be only non-contention based RA procedure. Or, the RA procedure may be both contention and non-contention based RA procedure.

The UE determines whether the number of the RA preamble transmissions is equal to a maximum number of RA preamble transmissions. If it is determined that the number of the RA preamble transmissions is equal to the maximum number of RA preamble transmission, in step S120, the UE stops UL transmission of all cells in a group to which the second node belongs, and does not trigger the RRC connection re-establishment procedure. If the number of the RA preamble transmissions is equal to preamble-TransMax, the UE may consider the RA procedure unsuccessfully completed, and flush the HARQ buffer used for transmission of the MAC PDU in the message 3 buffer.

The group may include one or more cells. The information on the group (i.e., which cell belongs to which group) may be configured by the eNB. Further, the group may include a timing advance group (TAG). The TAG may include one or more cells, and the cells in a TAG may share the same timing advance. Alternatively, the UE may only stop UL transmission of a cell where the RA preamble was transmitted. That is, the UE may only stop UL transmission of the second node.

The UL transmission may include at least one of a PUSCH transmission, a PUCCH transmission, an RA preamble transmission, a channel state information (CSI) reporting, an SR transmission, a HARQ feedback, or a sounding reference signal (SRS) transmission. The CSI reporting may include at least one of a CQI, precoding matrix indicator (PMI), a rank indicator (RI), or a precoding type indicator (PTI).

If it is determined that the number of the RA preamble transmissions is equal to the maximum number of RA preamble transmission, the UE may further transmit an indication indicating that the RA problem occurred, which means that transmission of the RA preamble has failed, to the first node. The indication may include information on the second node. The information on the second node may include at least one of a problem identifier identifying the RA problem, a physical cell identifier of the second node, a global cell identifier of the second node, a cell identifier of the second node (assigned by either the first node or second node).

The first node may be an MeNB in dual connectivity in which an SRB is defined, and the second node may be an SeNB in dual connectivity in which an SRB is not defined. Alternatively, the first node may be an SeNB in dual connectivity, and the second node may be an MeNB in dual connectivity.

Meanwhile, the present invention may be limited to a cell indicated by the eNB. That is, the present invention may be applied only when the RA preamble is transmitted on the cell indicated by the eNB. It means that the eNB transmits an indication indicating that the present invention is applied.

Figure 19:
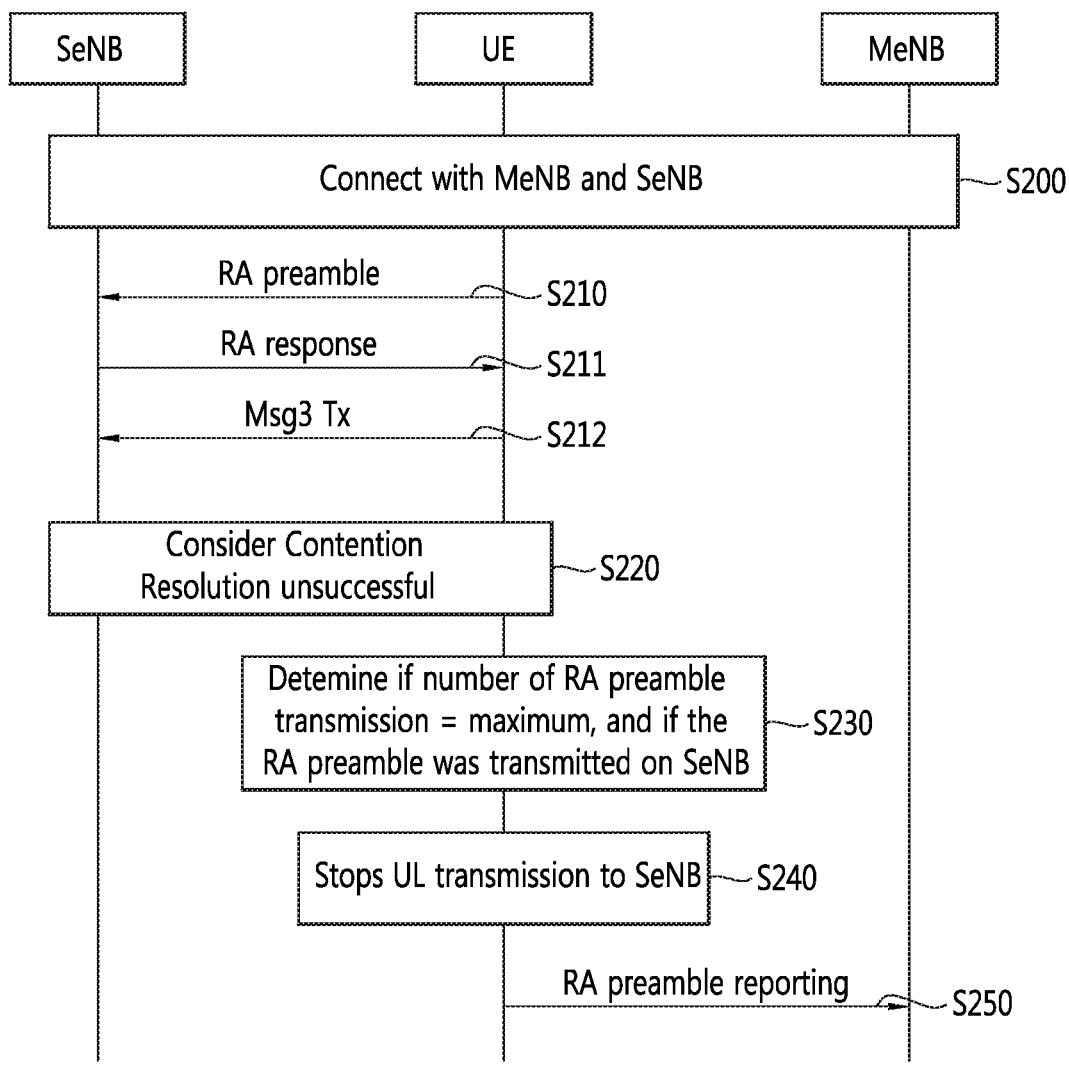
FIG. 19 shows another example of a method for performing a random access procedure according to an embodiment of the present invention.

FIG. 19 shows another example of a method for performing a random access procedure according to an embodiment of the present invention.

In step S200, the UE is connected to the MeNB and the SeNB.

In step S210, the UE transmits an RA preamble to the SeNB since the UE needs an RA procedure for some reasons. The RA preamble may be selected by the UE. This RA preamble may be also the RA preamble for retransmissions. In step S211, the UE receives the RA response from the SeNB. In step S21, the UE transmits the MAC PDU in the message 3 buffer to the SeNB.

In step S220, the UE considers the contention resolution (CR) unsuccessful due to, e.g., expiry of the CR timer.

In step 230, the UE determines whether the number of RA preamble transmissions in this RA procedure is equal to a maximum number configured by the eNB. Also, the UE determines whether the RA preamble was transmitted on the indicated cell, i.e., the SeNB.

In step S240, if it is determined that the number of RA preamble transmissions in this RA procedure is equal to a maximum number configured by the eNB and if it is determined that the RA preamble was transmitted on the SeNB, the UE stops UL transmission including the RA preamble transmission, PUCCH transmission, PUSCH transmission, CSI reporting, SRS transmission, etc.

In step S250, the UE transmits RA problem reporting to the MeNB. The RA problem reporting may include e.g., the cell identifier of the SeNB.

Figure 20:
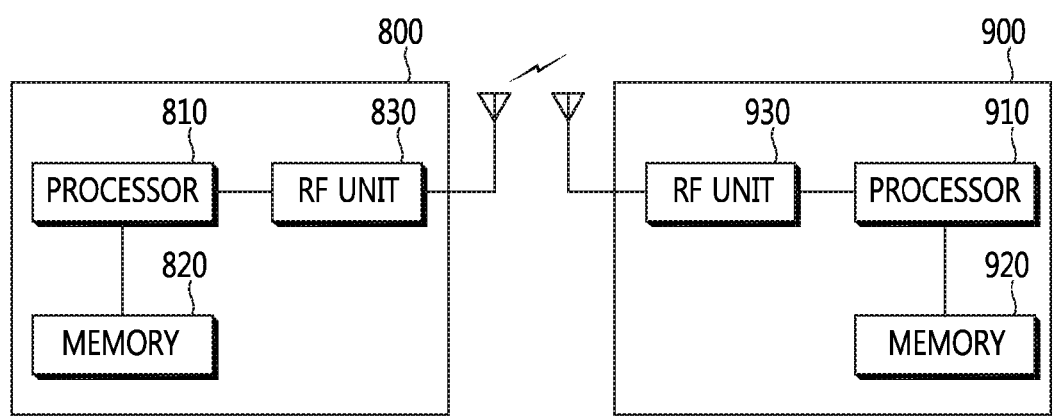
FIG. 20 is a block diagram showing wireless communication system to implement an embodiment of the present invention.

FIG. 20 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing a random access (RA) procedure by a user equipment (UE) in a wireless communication system, wherein the UE is connected to a master evolved NodeB (MeNB) and a secondary eNB (SeNB), method comprising:
    transmitting an RA preamble to the SeNB on a cell of a group associated with the SeNB;
    determining that a number of RA preamble transmissions reaches a maximum number of RA preamble transmissions;
    stopping uplink (UL) transmission to all cells of the group associated with the SeNB; and
    transmitting an indication indicating that an RA problem occurred by determination that the number of RA preamble transmissions reaches the maximum number of RA preamble transmissions to the MeNB.

2. The method of claim 1, wherein the RA problem indicates that the number of RA preamble transmissions reaches a maximum number of RA preamble transmissions.

3. The method of claim 1, wherein the group includes a timing advance group (TAG); and
    wherein the same TA is applied to all of cells in the TAG.

4. The method of claim 1, wherein the UL transmission includes at least one of a physical uplink share channel (PUSCH) transmission, a physical uplink control channel (PUCCH) transmission, an RA preamble transmission, a channel state information (CSI) reporting, a scheduling request (SR) transmission, a hybrid automatic repeat request (HARQ) feedback, or a sounding reference signal (SRS) transmission.

5. A user equipment (UE) in a wireless communication system, wherein the UE is connected to a master evolved NodeB (MeNB) and a secondary eNB (SeNB), the UE comprising:
    a memory;
    a radio frequency (RF) unit; and
    a processor, coupled to the memory and the RF unit, that:
    controls the RF unit to transmit an RA preamble to the SeNB on a cell of a group associated with the SeNB,
    determines that a number of RA preamble transmissions reaches a maximum number of RA preamble transmissions,
    controls the RF unit to stop uplink (UL) transmission to all cells of the group associated with the SeNB; and
    controls the RF unit to transmit an indication indicating that an RA problem occurred by determination that the number of RA preamble transmissions reaches the maximum number of RA preamble transmissions to the MeNB.

6. The UE of claim 5, wherein the RA problem indicates that the number of RA preamble transmissions reaches a maximum number of RA preamble transmissions.

7. The UE of claim 5, wherein the group includes a timing advance group (TAG); and
    wherein the same TA is applied to all of cells in the TAG.

8. The UE of claim 5, wherein the UL transmission includes at least one of a physical uplink share channel (PUSCH) transmission, a physical uplink control channel (PUCCH) transmission, an RA preamble transmission, a channel state information (CSI) reporting, a scheduling request (SR) transmission, a hybrid automatic repeat request (HARQ) feedback, or a sounding reference signal (SRS) transmission.

* * * * *